United States Patent
Terzini et al.

(12) 
(10) Patent No.: US 6,467,708 B1
(45) Date of Patent: Oct. 22, 2002

(54) METHOD OF PROCESSING MUNICIPAL WASTE

(76) Inventors: Robert Terzini, 138 E. Clinton Dr., Rome, GA (US) 30165; Willis R. Campbell, 14129 Locust St., Olathe, KS (US) 66062

(*) Notice: Subject to any disclaimer, the term of this patent is extended or adjusted under 35 U.S.C. 154(b) by 44 days.

(21) Appl. No.: 09/775,110

(22) Filed: Feb. 1, 2001

Related U.S. Application Data

(60) Provisional application No. 60/179,818, filed on Feb. 2, 2000.

(51) Int. Cl.[7] .............................................. B02C 19/12
(52) U.S. Cl. ................... 241/23; 241/24.14; 241/24.15; 241/24.18; 241/24.19; 241/29
(58) Field of Search ........................... 241/DIG. 38, 23, 241/24.14, 24.15, 24.18, 24.19, 29

(56) References Cited

U.S. PATENT DOCUMENTS 5,184,780 A * 2/1993 Wiens ...................... 241/101.2
5,976,435 A * 11/1999 Djerf et al. ................. 264/112

* cited by examiner

*Primary Examiner*—Mark Rosenbaum
(74) *Attorney, Agent, or Firm*—Miller Law Group, PLLC

(57) ABSTRACT

A method for processing municipal waste substantially reduces the volume of material to be disposed into a landfill by increasing the volume of materials of value collected from the municipal waste and by composting the remaining materials to create a salable product. The process includes the removal of materials of value by magnetic devices to extract ferrous materials, by an air classifier to extract light plastic materials, by an eddy current mechanism to extract aluminum materials, and by a plastic sort mechanism to extract large plastic materials. Composting can be accomplished with a composting vessel that is located in the process either before the materials of value are removed or afterward. A grinding of the materials before a final screening allows the commercial grade compost to be separated from the materials that are to be sent to the landfill for final disposal. An alternative embodiment of the process heats the waste material before processing by utilizing a steam pressure vessel or an autoclave to disintegrate the waste material and to destroy any pathogens before materials of value are removed. Large materials can be gasified to create heat energy for use in the heating process. Static pile disintegration of the initially shredded waste material will alternatively reduce the volume of the material to be processed.

18 Claims, 5 Drawing Sheets

METHOD OF PROCESSING MUNICIPAL WASTE

CROSS-REFERENCE TO RELATED APPLICATIONS

This application claims domestic priority on U.S. Provisional Patent Application Serial No. 60/179,818, filed Feb. 2, 2000.

BACKGROUND OF THE INVENTION

This invention relates generally to the processing of municipal waste, to reduce the amount of material being placed into landfills and, more particularly, to a process by which the reclamation of materials of value from the municipal waste can be enhanced.

While re-cycling of materials of value, including glass, plastic, steel (such as cans) and aluminum, from municipal waste has been done in the past, the process has been generally labor intensive and marginally profitable. Some re-cycling efforts have been started at the home and office, by segregating materials of value to be collected independently of the remaining trash materials, yet participation is irregular and too much municipal waste is still placed into landfills that are overburdened and potential sources of water pollution.

Composting has been used for many years to reduce trash materials into an organic material that can be safely discharged to the ground. Composting has recently been on the increase at municipal sites where large composting vessels and/or static compost piles are being used to reduce the amount of material being deposited into the landfill and to increase the amount of materials being re-cycled. Substantially any organic material can be composted, provided an adequate quantity of carbon material is provided with access to air. Carbon sources include paper, cardboard, grass clippings, leaves, hay, straw, wood chips and sawdust, among many others. Many of these sources of carbon for effective composting is found in municipal waste, particularly paper and cardboard. Accordingly, composting presents an effective process for re-cycling materials and reducing the volume of material being placed into the landfills.

Many other materials of value are still available in municipal waste, despite the efforts to require segregation of such materials at the point of origin. Labor intensive practices will not be cost effective to reclaim these materials of value. Accordingly, an improved process through which a greater amount of materials of value can be reclaimed at a cost effective manner is highly desirable.

SUMMARY OF THE INVENTION

It is an object of this invention to provide a method for processing municipal waste to reduce the volume of materials being sent to a landfill for final disposition.

It is another object of this invention to provide a method of processing municipal waste that increases the extraction of materials of value to provide an income source for establishing the process.

It is a feature of this invention that mechanical devices can be utilized to extract materials of value from the waste material stream throughout the process.

It is an advantage of this invention that labor used for processing municipal waste is reduced.

It is still another object of this invention to compost the small and fine materials divided out of the stream of waste material.

It is another feature of this invention that composting vessels can be utilized to compost waste material on an on-going basis.

It is still another feature of this invention that the number of composting vessels can be matched in processing time to a shredding mechanism to form a cell.

It is another advantage of this invention that the compost developed from this process can be sold as a commercial grade compost.

It is a yet another object of this invention to provide a method of processing municipal waste that provides an initial disintegration and a destruction of pathogens within the waste material stream.

It is yet another feature of this invention to utilize a steam pressure vessel to disintegrate the waste materials and to destroy pathogens.

It is still another advantage of this invention that the composting step can be used early in the process before materials of value are extracted or late in the process after materials of value have been extracted.

It is a further object of this invention to provide apparatus for accomplishing this process of handling municipal waste to increase the volume of extracted materials of value and to reduce the volume of materials being disposed in a landfill which is durable in construction, inexpensive of manufacture, carefree of maintenance, facile in assemblage, and simple and effective in use.

These and other objects, features and advantages are accomplished according to the instant invention by providing a method for processing municipal waste which substantially reduces the volume of material to be disposed into a landfill by increasing the volume of materials of value collected from the municipal waste and by composting the remaining materials to create a salable product. The process includes the removal of materials of value by magnetic devices to extract ferrous materials, by an air classifier to extract light plastic materials, by an eddy current mechanism to extract aluminum materials, and by a plastic sort mechanism to extract large plastic materials. Composting can be accomplished with a composting vessel that is located in the process either before the materials of value are removed or afterward. A grinding of the materials before a final screening allows the commercial grade compost to be separated from the materials that are to be sent to the landfill for final disposal. An alternative embodiment of the process heats the waste material before processing by utilizing a steam pressure vessel or an autoclave to disintegrate the waste material and to destroy any pathogens before materials of value are removed. Large materials can be gasified to create heat energy for use in the heating process. Static pile disintegration of the initially shredded waste material will alternatively reduce the volume of the material to be processed.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
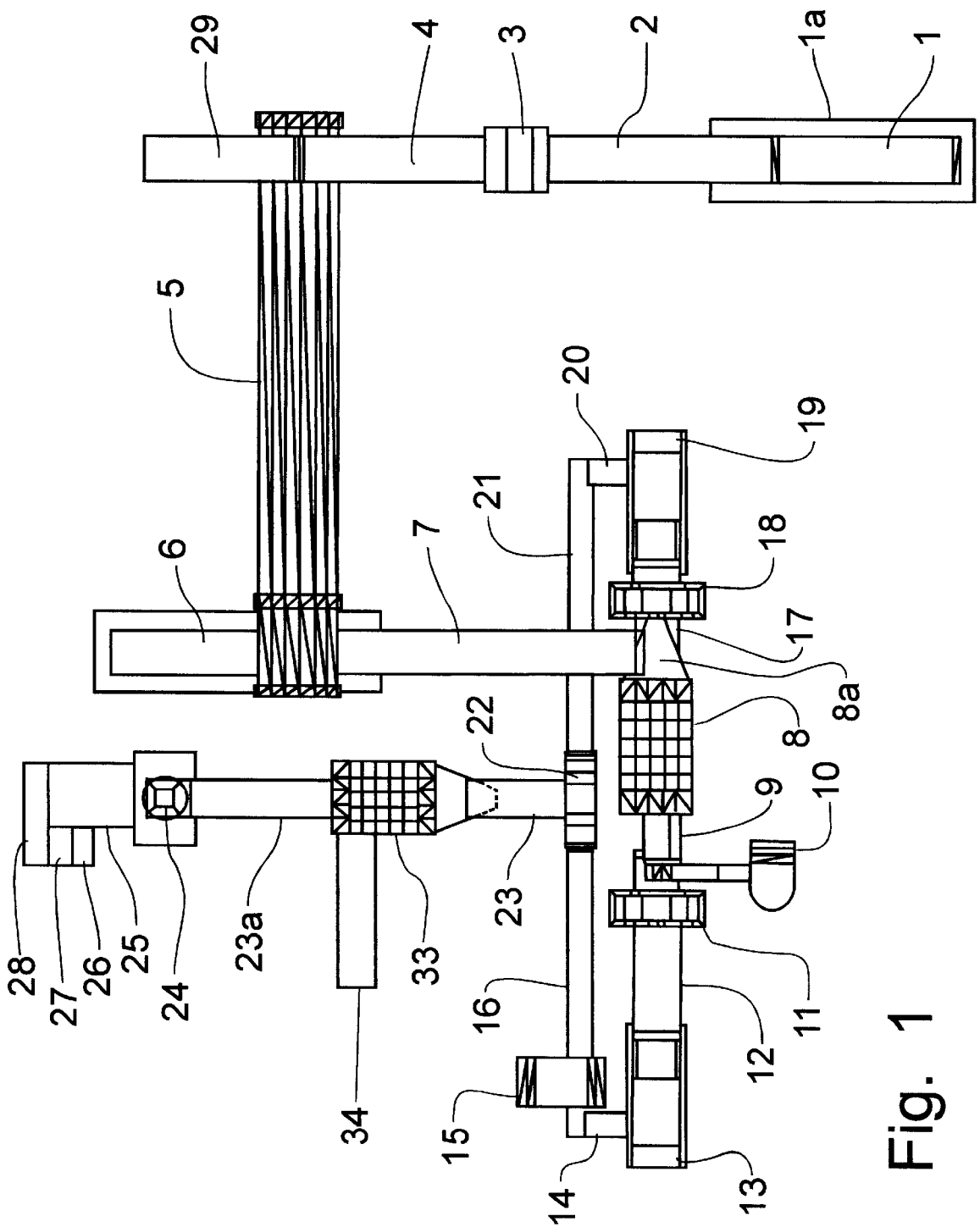
FIG. 1 is a top plan view of an apparatus or system for practicing the method of processing municipal waste incorporating the principles of the instant invention, the depicted apparatus utilizing a single composting vessel.

Referring now to FIGS. 1–4, the method and apparatus for processing municipal waste material, incorporating the principles of the instant invention, can best be seen. The process begins with the dumping of municipal waste material from collection trucks (not shown) onto a tipping floor, whereupon the waste material is pushed into a pit 1a in which a first conveying mechanism, preferably a belt conveyor 1, is found. One skilled in the art will readily recognize that belt conveyors, as will be described throughout this application, are preferable conveying devices, but other conveyors, such as a chain and slat conveyor as an example, can also be utilized to provide each of the conveying functions described herein.

The waste material is conveyed out of the pit 1a onto a shredder infeed conveyor 2 that carries the collected waste material into the shredder 3. Much of the waste material will typically be contained in plastic bags. The primary purpose of the shredder 3 is to open the plastic bags to release the waste material therein. Preferably, the shredder 3 will have a cutting mechanism (not shown) that will shred the waste material into pieces about four inches wide. Clearly, some comminution of the waste material will certainly occur, and is desired to de-clump the waste material; however, the primary purpose of the shredder 3 is to release the material from the plastic bags. Accordingly, other alternative devices could be utilized in place of the shredder, such as an automated bag opener or manual labor that opens the bags to release the waste material. The shredder 3 is preferred because of the ancillary benefits of creating a more homogeneous mixture of the waste material and obtaining a sizing of the material to enhance subsequent operations.

After being shredded in the shredder 3, the released waste material is conveyed by a belt conveyor 4, which discharges onto a reversing transfer conveyor 29. In the single composting vessel embodiment of FIG. 1, the transfer conveyor 29 may not be necessary as the conveyor 4 could feed material from the shredder directly into the first composting vessel 5. For the purposes of expansion or for the multiple composting vessel embodiment of the invention depicted in FIG. 2, the reversing transfer conveyor 29 is desired. Nevertheless, the next step of the process is to compost substantially all of the material being discharged from the shredder 3; therefore, this material is loaded into the first composting vessel 5.

Depending on the price of cardboard as a material of value, a business decision needs to be made with respect to the process before loading the released and shredded waste material into the composting vessel 5. Cardboard and paper are excellent carbon sources for proper operation of the composting process; however, if the price of re-cycled cardboard and paper is sufficient to warrant the removal of cardboard and paper as a material of value, the cardboard and paper material must be removed prior to loading the released and shredded waste material into the composting vessel 5. Preferably, the cardboard material is pulled from the waste material stream by manual labor off the belt conveyor 4, after being shredded in the shredder 3. Alternatively, the cardboard material could be pulled from the stream of waste material before reaching the shredder 3. Should cardboard and paper waste material be removed from the waste material stream before being loaded into the composting vessel 5, the carbon source material must be replaced. One possible source would be sawdust or other wood products, if available, or grass clippings, leaves, hay, straw, or the like, which could be fed into the composting vessel 5 as part of the waste material stream on conveyor 4 or loaded simultaneously from a separate conveyor (not shown).

Figure 2:
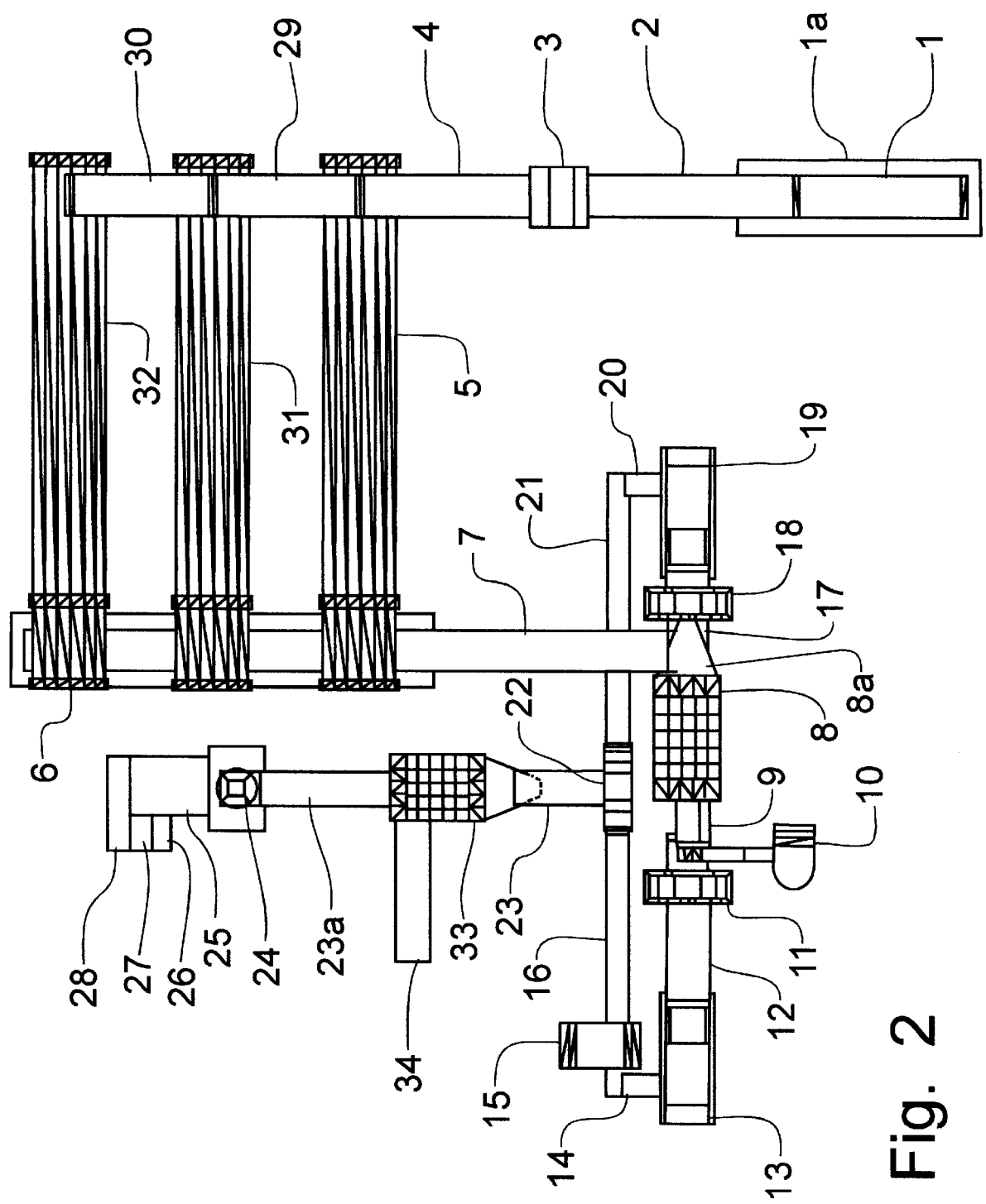
FIG. 2 is a top plan view of an apparatus similar to that of FIG. 1, except incorporating multiple composting vessels.
Figure 3:
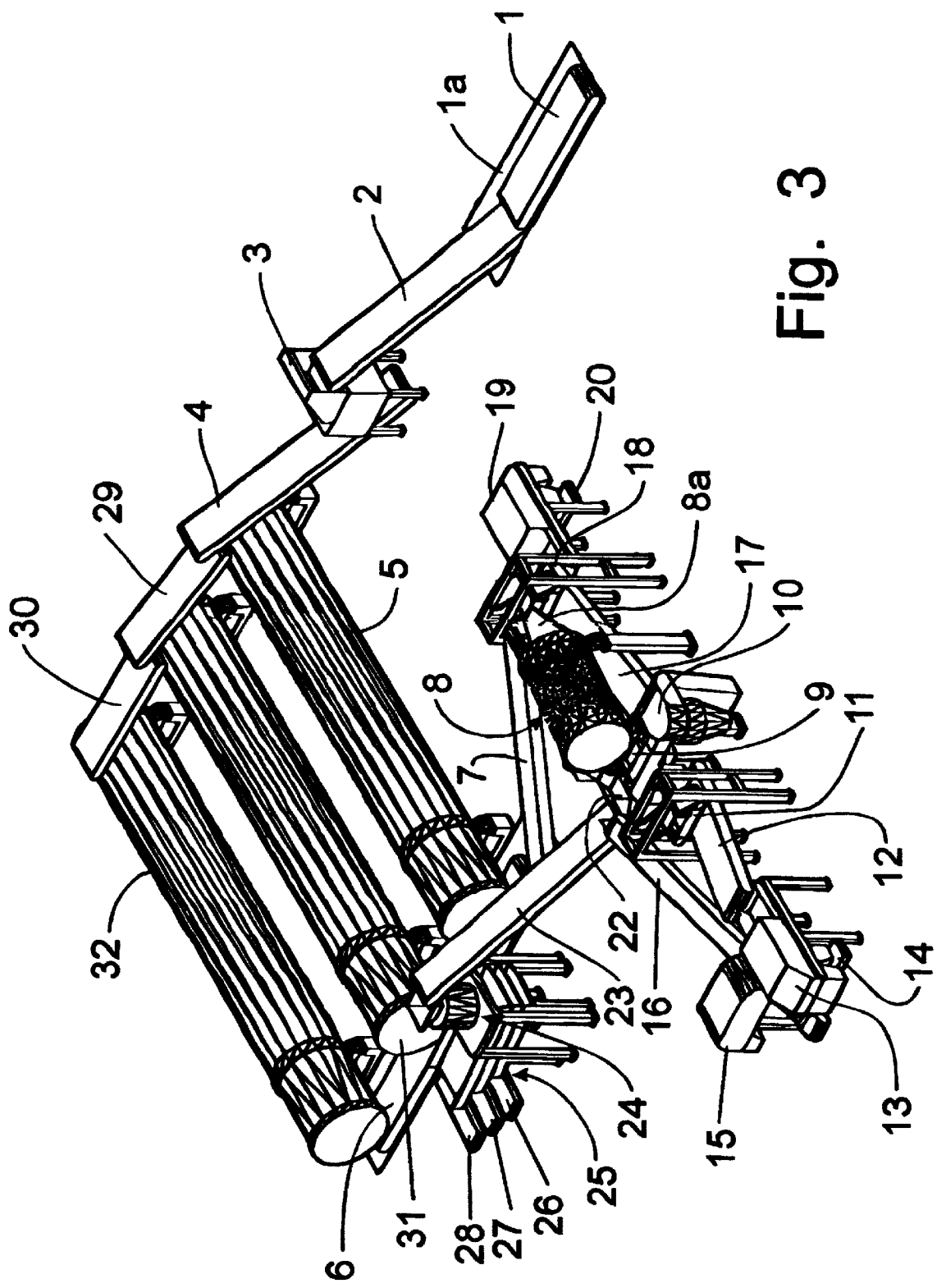
FIG. 3 is a perspective view of an apparatus similar to that of FIG. 2, except for the lack of a second screening mechanism.
Figure 4:
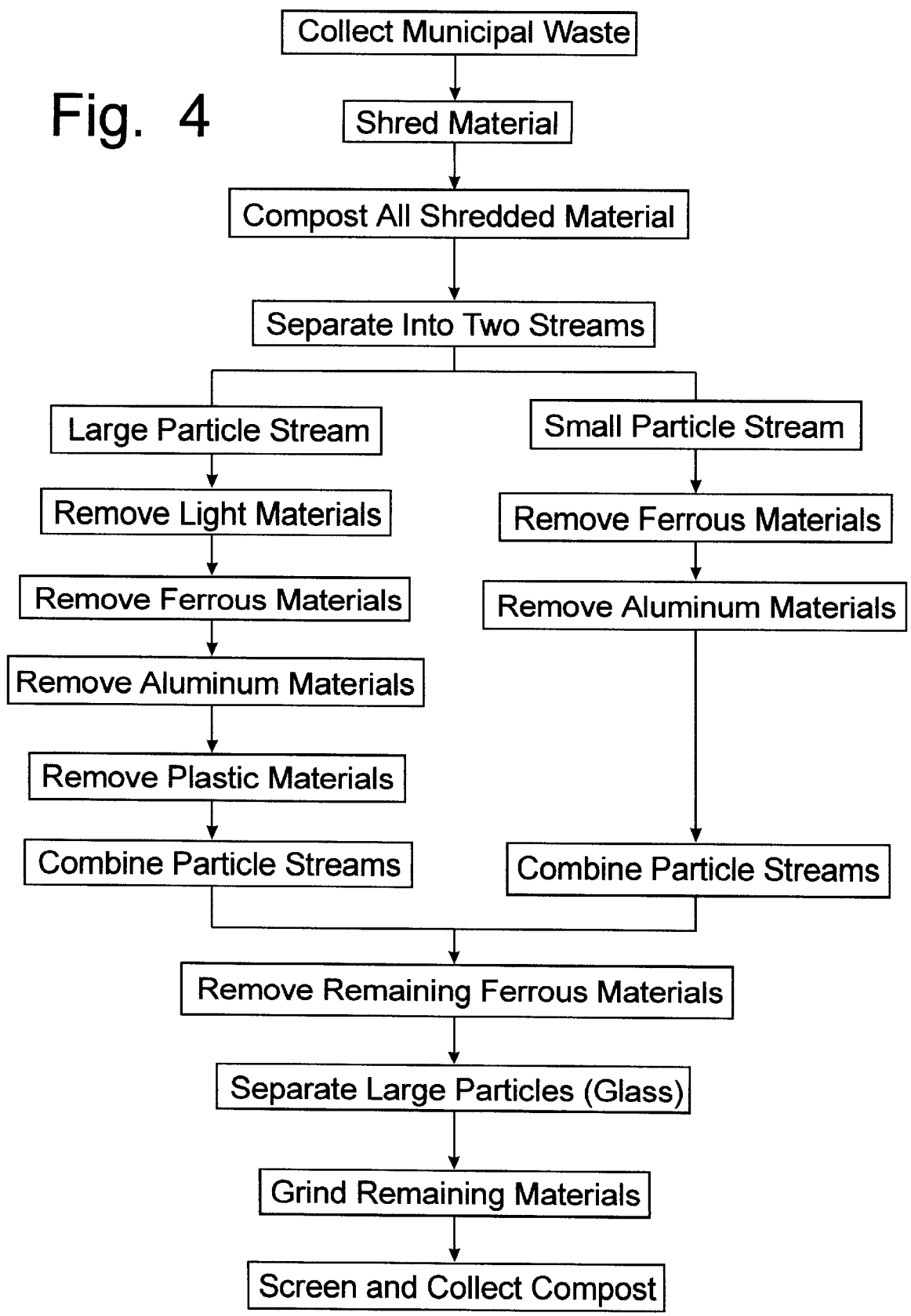
FIG. 4 is a process flow diagram for the method of processing municipal waste according to the apparatus of FIGS. 1–3.

In the embodiment of FIGS. 2 and 3, multiple composting vessels 5, 31, 32 are provided to handle the entire waste flow from the shredder 3. In the specific embodiment of FIGS. 2 and 3, three composting vessels 5, 31, 32 are depicted; although one skilled in the art will readily recognize that the number of composting vessels required will depend on the throughput speed of the composting vessels 5, 31, 32 and the volume of waste material coming through the shredder 3. Of course, if the flow of waste material from the pit 1a is too great for a single shredder 3, multiple shredders 3 can also be provided along the same manner as described below with respect to three composting vessels. As many as seven composter vessels (depending on the size thereof) could be serviced by a single shredder 3. The matching of the output of the shredder 3 to the input of the composter vessels can be referred to as a cell. Multiple cells, or even portions of a cell, could be utilized for expansion or for planning for large installations.

As shown specifically in FIGS. 2 and 3, the reversing transfer conveyor 29 is operable to load the composting vessel 5 when operating in one direction, and the middle (adjacent) composting vessel 31 when the direction of operation of the cross conveyor is changed, providing that only two composting vessels 5, 31 are utilized. Similarly, the use of the second reversing transfer conveyor 30 will allow both the composting vessels 31, 32 to be loaded by the second reversing transfer conveyor 30, which will change directions as necessary to effect loading of the appropriate composting vessel 29, 30. Accordingly, in the three-vessel composting method, the composting vessel 5 should be the first loaded and the easiest to maintain. The remaining composting vessels 31, 32 will be loaded by the operation of the reversing conveyors 29, 30 as material is fed thereto by the tilted conveyor 4.

In other words, waste material will be delivered by the tilted conveyor 4 onto the first reversing conveyor 29, which will in turn load the first composting vessel 5 or transfer the waste material onto the second reversing conveyor 30. If the latter, the second reversing conveyor 30 will feed waste material into either the second composting vessel 31 or the third composting vessel 32, depending on the direction of operation. The expansion of this loading system to accommodate the loading of shredded waste material into more than three composters will be clear to one of ordinary skill in the art. For example, additional reversing conveyors (not shown) can be located to span the gap between subsequent composter vessels (not shown) in the same manner described above to effect the loading of shredded waste material into all of the composter vessels in each cell.

The composting vessels 5, 31, 32 are rotatable and retain the waste material within the composting vessels for a number of days, preferably three days or more, in order to convert the waste material into useable compost. Other devices and/or processes can be used in lieu of the in-vessel rotary composting, including passive composting techniques, aerated static piles, and a smaller single drive rotary compost. The primary purpose in providing "up-front" composting is to reduce the volume of waste material to be processed, as well as convert much of the waste material into a useable by-product. Materials of value are not going to be composted as they are not organic materials. Glass, steel, aluminum and plastic will come through the composting process in tact, while the organic waste material and the carbon source will be converted into generally odorless compost.

Composted waste material, along with the entrained materials of value, is then discharged from the rotating composting vessels 5, 31, 32 into a collection pit onto a pit conveyor 6. The discharge from the composting vessels 5, 31, 32 is then carried vertically by the infeed conveyor 7 to a screening mechanism 8. Preferably, this screening mechanism 8 is a rotary screen device known as a trommel; however, other known devices will also suffice, including a vibratory screen mechanism, a rotary blade screen and a finger screen. The trommel 8 has an infeed chute 8a that receives the discharge from the infeed conveyor 7 and conveys the compost and materials of value into the screening mechanism 8 to divide the discharged material into two streams. One stream comprises mostly compost, which would pass through, preferably, a one inch screen, and will be discharged to the right of the trommel 8 (as viewed on the FIGS. 1 and 2). The treatment of this small particle stream will be discussed in greater detail below.

The other stream of material to be discharged from the trommel 8 has a size that is generally larger than will pass through the one inch screen and comprises predominately materials of value that are to be re-claimed from the material stream. This large particle stream will be conveyed out of the trommel 8 by a conveyor 9 into an air classifier 10. The air classifier 10 is operable to separate light materials, particularly the plastic film material that results from the shredding of the plastic bags at the shredder 3, for reasons that will become apparent below, and other recyclable materials such as polystyrene and the like. The air classifier 10 is depicted off to the side of the otherwise linear flow of material from the trommel 8, primarily to facilitate the recovery of materials reclaimed therefrom. Clearly, other configurations would suffice. Other known equipment will provide similar results, including a bounce adherence conveyor, and the function could be accomplished by manual methods as well. The primary goal for this step of the process is to remove the plastic film material and other lightweight materials.

The discharge from the air classifier 10 is conveyed on the belt conveyor 12 which passes the stream of co-mingled waste materials beneath a magnetic cross conveyor 11. This apparatus will removed ferrous materials, such as steel cans, from the large particle stream. As with the other pieces of equipment in this system, the magnetic cross conveyor is the preferred embodiment; however, other devices can also be utilized, including a pneumatic steel sort system or manual methods. A conventional recovery apparatus (not shown) will collect the recovered ferrous materials for further processing and sale.

The large particle stream continues on the belt conveyor 12, which forms the infeed for an eddy current mechanism 13 for the separation of aluminum materials from the material stream. The eddy current mechanism 13 is set to effect the repelling of aluminum in a conventional manner. Accordingly, this device will traject aluminum material away from the stream and be captured in a collector located on the opposing side of the discharge therefrom into a transfer conveyor 14, as best seen in FIG. 3. The alternative devices include a pneumatic aluminum sort system, and of course a manual operation could also be utilized to extract the aluminum materials.

The large particle stream, which has already been depleted of most of the lightweight plastic materials, as well as the ferrous and aluminum materials, is then conveyed onto belt conveyor 16 which first passes the depleted large particle stream through a pneumatic plastic sort system 15, which is a commercially available mechanism that senses the presence of plastic by light source or by density sensors to identify the presence of plastic and utilizes air blasts to remove the plastic material from the waste stream. Because of the stronger bursts of air utilized in the pneumatic plastic sort system 15, as compared to the air blasts used in the air classifier 10, it was important to remove the plastic film and other lightweight materials from the large particle stream at the air classifier before reaching the plastic sort system 15. Clearly, an alternative is to pick the plastic materials out of the large particle stream manually.

The belt conveyor 16 continues the flow of the now largely depleted large particle stream, as most of the materials of value have been removed from the stream. Some undesirable materials would remain, as well as large glass particles that would not pass through the one inch screen at the trommel 8. The conveyor 16 discharges the depleted large particle stream into a rotary magnetic drum pulley 22 where the depleted large particle stream is re-joined with the small particle stream which is also discharged into the rotary magnetic drum pulley 22. The purpose of the rotary magnetic drum pulley is to remove the smaller ferrous particles that might still remain in the two particle streams before further processing.

Meanwhile, the small particle stream of material was discharged through the trommel 8 screening device onto a belt conveyor 17 that conveys material to the right (as viewed in FIGS. 1 and 2), oppositely of the large particle stream. The conveyor 17 preferably passes beneath the infeed chute 8a of the trommel 8 and beneath a magnetic cross conveyor 18 that operates to remove ferrous particles within the small particle stream, similarly to the operation of the magnetic cross conveyor 11 for the large particle stream. The conveyor 17 then discharges the remaining small particle stream into an eddy current mechanism 19 that operates on the small particle stream in the same manner as the eddy current mechanism 13 operates on the large particle stream in order to traject aluminum materials into a collection bin. The discharge from the eddy current mechanism 19 is preferably received by a transfer conveyor 20 that discharges onto a belt conveyor 21 that returns the small particle stream to the rotary magnetic drum pulley 22 for the final pass at removing any ferrous materials from the now combined small and large particle streams. One skilled in the art will realize that the combined streams in the rotary magnetic drum pulley 22 is largely compost coming from the small particle stream that passes through the one inch screening mechanism 8. The large particle stream is largely depleted and will be adding little to the volume of the small particle stream.

After the remaining ferrous materials are recovered from the rotary magnetic drum pulley, the combined material streams are discharged onto a belt conveyor 23 which transfers the material to a second screening mechanism 33, preferably another rotary screening mechanism, to remove any remaining large particles onto conveyor 34, which will primarily be glass material, although any large undesirable materials will also be removed from this process with the large glass particles. Further processing, such as manual picking, will be operable to separate the undesirable materials from the recoverable glass particles. The second rotary screening device 33 will then discharge onto another belt conveyor 23a that will convey the remaining materials, which pass through, preferably, a ⅜ inch screen 33, into a vertical shaft grinder 24.

The purpose of the grinder 24 is to reduce the remaining material, such as compost, glass, wood, gravel, etc. in the stream on the conveyor 23a to a granulated size. Largely this material will be compost; however, some small particles of other non-compost material, such as glass, will still be in the material stream. The grinder 24 will grind the non-compost material into a fine particle that will be capable of being included in the compost that will be discharged from the grinder 24. The primary purpose of the grinder 24 is to make the compost and other remaining material a uniform size resembling peat moss. Other alternative devices can be used to reduce the size of the particles in the material stream, such as a cyclonic dehydrating comminuter, a hammer mill and/or a ball mill, which will provide a high speed pulverization of the material on the conveyor 23a, as well as effect a dehydration thereof. Preferably, the undesirables separated from the conveyor 34 could further be processed to reclaim any remaining materials of value before discarding the residue.

The pulverized material discharged from the grinder 24 will be run through a multi-stage vibratory screen 25 to sort the materials by size, exiting on the collecting conveyors, 26–28. Of course, the grinder 24 will not likely be completely successful in reducing all of the material to a powder. The screening at 25 will provide a last sorting of the material. Any material passing through the vibratory screen 25 and exiting on conveyor 26 will be commercial grade compost and can be collected and sold as such. Some further sorting of the remaining materials coming off conveyors 27 and 28 can be accomplished to recover other materials of value, such as lead, copper, polystyrene, and future materials of value. The final remaining material will be undesirables that will be taken to the landfill, which will be a small percentage of the volume of material first entering the system at the pit 1a.

Figure 5:
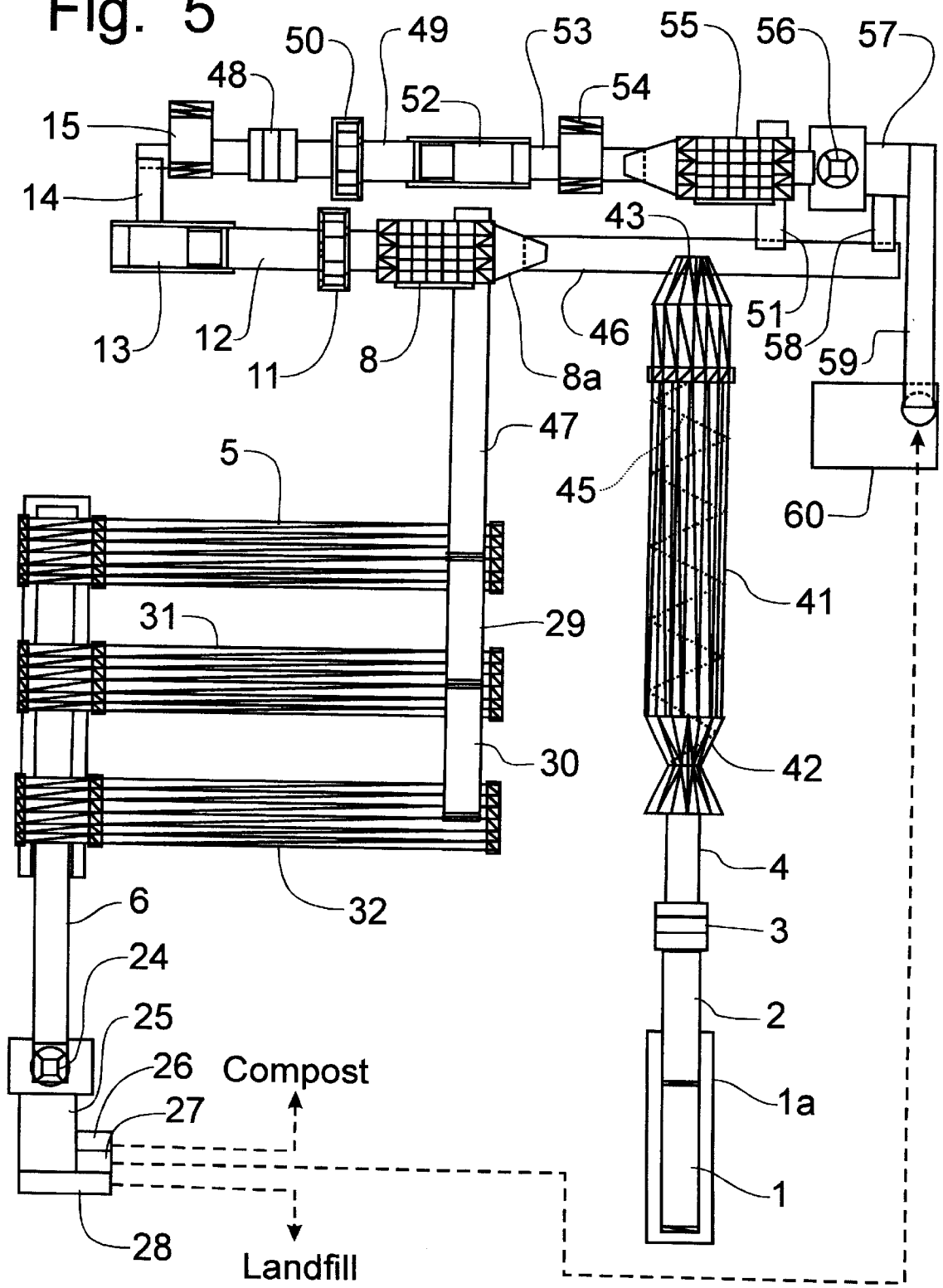
FIG. 5 is a top plan view of an apparatus or system incorporating an alternative embodiment of the method of processing municipal waste utilizing a steam pressure vessel and incorporating the principles of the instant invention.

Referring now to FIG. 5, an alternative system 40 for processing municipal waste can best be seen. The components of the alternative system 40 are generally as described above, except as will be noted below, with two major additions, a steam pressure vessel 41 and a gasifier 60. As described above, the municipal waste is dumped into a pit 1a from which the waste is transported by conveyors 1 and 2 to a shredder 3 that reduces the size of the waste stream to particles preferably having a size in the range of three to four inches. The discharge from the shredder 3 is carried on the conveyor 4 to the infeed end 42 of the steam pressure vessel 41. The conveyor 4 is arranged to load the waste stream into the vessel 41 and then retract while the vessel 41 is operated so that the vessel 41 can be sealed, as will be described in greater detail below.

The steam pressure vessel 41 is preferably a large, generally cylindrical vessel having a diameter approximately 12 to 13 feet and a length of about 65 feet. The infeed end 42 and the discharge end 43 of the vessel 41 can be sealed to allow the interior of the vessel 41 to be pressurized to approximately 50 psi with steam injected therein at a temperature of approximately 300 degrees Fahrenheit. The vessel 41 is loaded by the conveyor 4 while the vessel is being rotated. Internally of the vessel 41 is an Archimedes screw 45 that progresses the waste material toward the discharge end 43, which is sealed during the loading operation, until the vessel is about one-third to a half full, due to the opening at the infeed end 43 having a smaller diameter, approximately four feet, than the diameter of the body of the vessel 41. The ends 42, 43 of the vessel 41 are then sealed and the vessel 41 is pressurized with the injection of steam therein. Preferably, an automation of the loading and unloading of the vessel 41 will allow a cycle time of approximately 90 minutes, 30 minutes to load, 30 minutes to cook and 30 minutes to unload.

The result of the "cooking" of the waste material within the steam pressure vessel 41 is that the pathogens are destroyed, the volume of the waste material is reduced by as much as 60%, and the paper materials are reduced to fibrous cellulose. The volume of the waste material is reduced primarily because of the disintegration of the waste materials. Plastic film resulting from the shredding of plastic garbage bags at the shredder 3, as an example, are reduced to small balls of plastic. Plastic bottles are substantially shrunken in size due to a partial melting of the plastic. Cardboard, if not previously extracted from the waste stream, as described above, and/or other paper materials are decomposed into cellulose that will generally pass through the subsequent screening process, as will be described in greater detail below. The cellulose still has an energy potential of about 8000 BTU's per pound and the moisture content is approximately 50%, which will still provide an excellent carbon source for subsequent composting of the waste material. All labels of cans and bottles, for example, are removed and the ferrous materials are clean.

After the vessel 41 is de-pressurized and the discharge end 43 is unsealed, the waste material within the vessel 41 is discharged onto the conveyor 46 which loads the waste material into the infeed chute 8a of the rotary screening mechanism 8 having, preferably a ¾ inch screen to allow the passage of fine material passing through the screen onto a transfer conveyor 47 that will convey the fine material directly into composting vessels 5, 31 and 32, configured in a module format via reversing transfer conveyors 29, 30, as described above. The discharge from the composters 5, 31 and 32 is conveyed directly from a collection pit by the pit conveyor 6 into a vertical shaft grinder 24. The pulverized discharge of the grinder 24 is then screened by, preferably, a multi-stage vibratory screening mechanism 25 from which the fines are taken off by conveyor 26 to be sold as compost. The conveyor 27 from the middle size screen should contain primarily plastic balls or beads and other volatile materials and this material can be transferred to the gasifier 60. The materials on the conveyor 28 corresponding to the large screen will be transferred to the landfill, although this material, as noted above, can still contain some materials of value. Nevertheless, the volume of the material being sent to the landfill is substantially smaller than the volume of materials being initially dumped into the pit 1a.

Returning to the rotary screening mechanism 8, the materials not passing through the screen onto the compost infeed conveyor 47, will proceed longitudinally through the rotary screen 8 onto a conveyor 12 having a magnetic cross conveyor 11 associated therewith to effect the removal of ferrous materials, such as steel cans. The remaining material is then conveyed into the eddy current mechanism 13 for the removal of aluminum materials, as is described in detail above. The remaining materials are discharged by a transfer conveyor 14 into a plastic sort system 15 that removes the shrunken plastic bottles and similar materials.

The rotary screen 8 should be able to separate about 50% of the material fed thereto by the infeed conveyor 46 to be sent directly to the composters 5, 31 and 32. Of the remaining 50% of the material discharged longitudinally from the rotary screening mechanism 8, the magnetic cross conveyor 11, the eddy current mechanism 13 and the plastic sort system 15 should remove about ⅔ of this material, discharging the remaining 30% (of the material being discharged from the vessel 41), referred to as "overs", into a second shredder 48 which will reduce this stream of materials into pieces preferably having a size of approximately one inch. Typically, the "overs" discharged from the plastic sort system will be such materials as cloth, carpet, and inorganic materials, such as wiring and wood. Often the "overs" are entangled, sometimes balled up into the size of a bushel basket. The second shredder 48 disintegrates this material into small pieces that can be further processed to remove materials of value.

The stream of pieces discharged from the second shredder 48 are conveyed on a conveyor 49 passing beneath a second magnetic cross conveyor 50 for the removal of any ferrous pieces of material. The conveyor 49 then discharges the remaining materials into a second eddy current mechanism 52 for the removal of aluminum pieces. A transfer conveyor 53 then transports the remaining stream of material into a second plastic sort system 54 for the removal of any plastic pieces within the stream. Finally the remaining stream of material is fed into a second rotary screening mechanism 55 to separate any fines that would have become entangled and not removed by the first rotary screening mechanism 8. These fines are discharged by the conveyor 51 onto the conveyor 46 and into the first rotary screening mechanism 8 to be separated from the subsequent stream of materials discharged from the vessel 41 to flow into the composters 5, 31 and 32.

The material not passing through the rotary screening mechanism 55 is fed longitudinally into a vertical shaft grinder 56. Any materials of significant mass, such as glass, will be pulverized. A vibratory screen 57 will separate fines, such as pulverized glass, for transfer via the transfer conveyor 58 onto the conveyor 46 to be fed into the first rotary screening mechanism 8. The larger materials will be taken off the screen 57 by the transfer conveyor 59 and fed into a gasifier 60 which will burn these materials along with the materials transferred from the middle screen 27 at the first vibratory screen 25. The ash from the gasifier 60 can be added to the compost coming off the small screen conveyor 26. The ash needs to be screened to remove impurities, however, the ash will contain phosphorus and potassium, as well as trace amounts of copper sulfate (from copper wiring, etc. within the waste stream) which serves as a natural herbicide and pesticide for the compost, as long as the percentage is maintained within an acceptable range. The energy from the combustion of the materials fed into the gasifier 60 can be used to heat water for injection into the vessel 41 and/or to generate electricity for use onsite or to be sold.

In yet another variation of the process described above, it has been found that a static decomposition of the waste material after being run through the initial shredder 3, reference being made to FIGS. 1 and 2, by first placing the output from the shredder 3 into a windrow and applying composting bacteria to the static pile of waste material, effects a significant reduction of volume of the waste material before further processing is accomplished. Preferably, the bacteria would be added to the material as it is being discharged from the shredder 3 so that the bacteria would be fairly uniformly distributed throughout the waste material. A buffer can be added to the windrow to control the odor and to control the PH level close to a neutral 7.0. The static windrow can digest for a period of time from a few hours to a few days, until a reduction in volume occurs in the range of about 50% of the incoming volume of the material as it was being loaded into the shredder 3.

This reduced volume of waste material from the static pile allows for a easier removal of the materials of value by the devices described in greater detail above, such as the air classifier 10, the magnetic cross conveyors 11, the eddy current mechanism 13, and the plastic sort mechanism 15. Preferably, the processing of the waste material will follow the procedure described above with respect to FIG. 5 after being discharged from the pressure vessel 41, except that the static windrowing of the waste material is in substitution of the processing through the pressure vessel 41 and that the use of the second shredder or grinder 48 would not be necessary. Preferably, the grinder 3 will have the capability to re-grind the material to a size envisioned for the grinder 48. The remaining waste material can then be processed in the composting vessels as described with respect to FIG. 5 above to provide the desired end results.

As a further alternative to the process described above with respect to FIG. 5, the pressure vessel 41 can be replaced by an autoclave having a double wall construction that will keep the steam from contacting the waste material. Although the temperature reached in the waste material would be substantially the same as anticipated with the pressure vessel 41, the autoclave would have the advantage of not losing steam and great amounts of heat energy each time the end of the autoclave is opened to remove the "cooked" waste material, as would occur with the use of the pressure vessel 41. It should be noted that the plastic materials and some of the larger pieces of materials that could go through the composting vessels can be used as a fuel source for the generation of heat for the autoclave.

The processes described above, will not only reduce the amount of material going into the landfills by more than 90%, but changes the materials discharged as municipal waste into either a material of value to be recycled or into a usable product that can be applied to the land without damage to the ecology or converted into energy for additional uses.

One particularly valuable feature of this system is the adaptability to new processes that can be incorporated to remove materials of value in the future. Machines either under development or not yet conceived can be easily implemented into the system. The waste streams of tomorrow will not be the same as the waste steams of today and the above disclosed system for processing the waste material will be expandable to satisfy tomorrow's requirements.

One skilled in the art will recognize that other alternative devices and configurations of devices, than that described above, can be used within the scope and principles of the instant invention. For example, the sizes of the screening mechanisms 8, 33 are a matter of design choice and may best be determined in conjunction with the composition of the material being processed, perhaps by trial and error. The instant invention is intended to provide a system for processing solid municipal waste material through which significant amounts of materials of value can be reclaimed and recycled, thereby reducing substantially the amount of materials to be sent to a landfill. Such a system should be effective to reduce the volume of material traditionally sent to the landfill by as much as 85–95%, providing significant improvements heretofore unknown in the art.

It will be understood that other changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A method of processing waste comprising the steps of:
    gathering said waste into a stream of collected waste;
    shredding said collected waste in a grinding mechanism to reduce the size of a majority of particles within said collected waste to a predetermined size, said collected waste being discharged from said grinding mechanism as a stream of shredded waste;
    placing said shredded waste into a static pile and adding composting bacteria to said static pile of said shredded waste to obtain a reduction of volume of said shredded waste to a predetermined range to create a reduced volume shredded waste;
    dividing said reduced volume shredded waste into a large particle stream and a small particle stream;
    creating a stream of overs from said large particle stream by removing materials of value from said large particle stream;
    further processing said stream of overs to create a fine material stream and a large material stream;
    composting materials in said small particle stream and in said fine material stream within a composting vessel and obtaining a composted discharge therefrom;
    grinding all materials in said composted discharge to create a ground particle stream; and
    screening said ground particle stream and collecting compost therefrom.

2. The method of claim 1 wherein said dividing step includes the step of passing said reduced volume shredded waste through a screening apparatus, materials passing through said screening apparatus becoming said small particle stream while materials being discharged from said screening apparatus without passing therethrough becoming said large particle stream.

3. The method of claim 1 wherein said step of creating a stream of overs by removing materials of value from said large particle stream comprises the steps of:
    attracting ferrous materials out of said large particle stream;
    separating aluminum materials from said large particle stream; and collecting plastic materials from said large particle stream.

4. The method of claim 3 said step of attracting ferrous materials includes the step of passing said large particle stream through respective magnetic devices that attract ferrous materials to a location removed from the large particle stream.

5. The method of claim 3 wherein said step of separating aluminum materials includes the step of passing said large particle stream through respective eddy current mechanisms.

6. The method of claim 3 wherein said step of collecting plastic materials includes the step of passing said large particle stream through a pneumatic plastic sort system.

7. The method of claim 3 wherein said step of screening said ground particle stream includes the step of passing said ground particle stream through a multi-stage vibratory screen which will sort the materials in said ground particle stream by size.

8. The method of claim 3 further comprising the step of:
    shredding said stream of collected waste before said composting step.

9. The method of claim 3 wherein said step of further processing said stream of overs includes the steps of:
    shredding materials within said stream of overs to reduce the size of said materials to a predetermined maximum size;
    then, creating a reduced stream of overs by the steps of:
        extracting ferrous materials from said stream of overs;
        separating aluminum materials from said stream of overs; and
        collecting plastic materials from said stream of overs;
    then, screening said reduced stream of overs to create a first fine material stream and a first large material stream;
    then, grinding said first large material stream to create a ground large material stream;
    then, further screening said ground large material stream to create a second fine material stream and a final large material stream; and
    directing said first and second fine material streams to said composting vessel for said composting step.

10. The method of claim 9 wherein said dividing step includes the step of passing said reduced volume shredded waste into a screening apparatus, said first and second fine material streams being added to said screening apparatus with said reduced volume shredded waste to pass therethrough and be directed to said composting vessel.

11. The method of claim 9 wherein said step of creating a stream of overs includes the steps of:
    extracting ferrous materials from said large particle stream;
    separating aluminum materials from said large particle stream; and
    collecting plastic materials from said large particle stream.

12. A method of processing waste comprising the steps of:
    gathering said waste into a stream of collected waste;
    shredding said stream of collected waste to create a stream of shredded waste materials;
    heating said stream of shredded waste material to a predetermined temperature to create a disintegrated stream of waste material;
    dividing said disintegrated stream of waste material into a large particle stream and a small particle stream;
    creating a stream of overs from said large particle stream by removing materials of value from said large particle stream;
    further processing said stream of overs to create a fine material stream and a large material stream;
    composting materials in said small particle stream and in said fine material stream within a composting vessel and obtaining a composted discharge therefrom;
    grinding all materials in said composted discharge to create a ground particle stream; and
    screening said ground particle stream and collecting compost therefrom.

13. The method of claim 12 wherein said step of further processing said stream of overs includes the steps of:
    shredding materials within said stream of overs to reduce the size of said materials to a predetermined maximum size;

then, creating a reduced stream of overs by the steps of:
  extracting ferrous materials from said stream of overs;
  separating aluminum materials from said stream of overs; and
  collecting plastic materials from said stream of overs;
then, screening said reduced stream of overs to create a first fine material stream and a first large material stream;
then, grinding said first large material stream to create a ground large material stream;
then, further screening said ground large material stream to create a second fine material stream and a final large material stream; and
directing said first and second fine material streams to said composting vessel for said composting step.

14. The method of claim 13 wherein said final large material stream is fed into a gasifier to create heat energy for said step of heating said stream of shredded waste material.

15. The method of claim 12 wherein said dividing step includes the step of passing said disintegrated stream of waste material into a screening apparatus, said first and second fine material streams being added to said screening apparatus with said disintegrated stream of waste material to pass therethrough and be directed to said composting vessel.

16. The method of claim 15 wherein said step of heating said stream of shredded waste material includes the step of:
  loading said shredded waste materials into a steam pressure vessel to disintegrate said shredded waste material and to destroy pathogens in said shredded waste material, thereby creating said disintegrated stream of waste material.

17. The method of claim 15 wherein said step of heating said stream of shredded waste material includes the step of:
  loading said shredded waste materials into autoclave to disintegrate said shredded waste material and to destroy pathogens in said shredded waste material, thereby creating said disintegrated stream of waste material.

18. The method of claim 15 wherein said step of creating a stream of overs includes the steps of:
  extracting ferrous materials from said large particle stream;
  separating aluminum materials from said large particle stream; and
  collecting plastic materials from said large particle stream.

* * * * *